Aug. 25, 1964   N. MARFORIO   3,145,672
OVEREDGE STITCHING MACHINE
Filed March 20, 1962   14 Sheets-Sheet 4

Aug. 25, 1964   N. MARFORIO   3,145,672
OVEREDGE STITCHING MACHINE
Filed March 20, 1962   14 Sheets-Sheet 5

Aug. 25, 1964   N. MARFORIO   3,145,672
OVEREDGE STITCHING MACHINE
Filed March 20, 1962   14 Sheets-Sheet 6
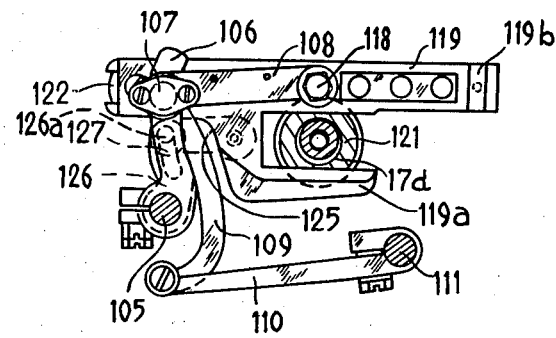
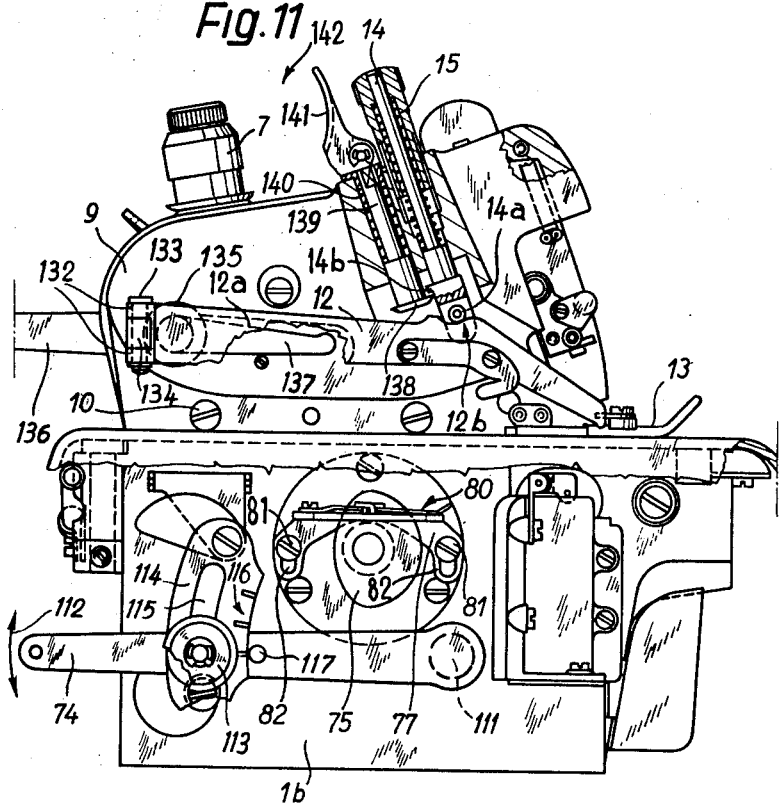

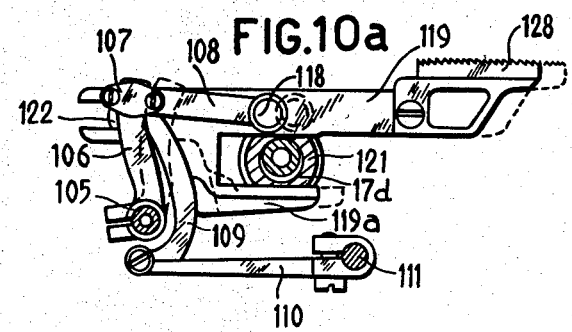
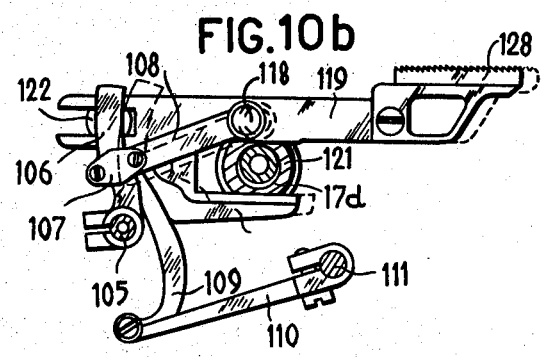
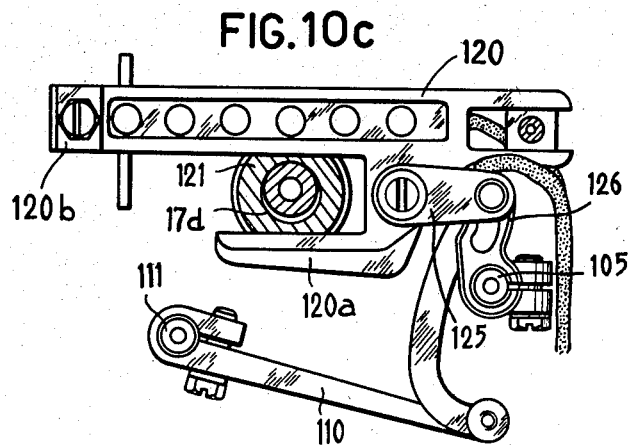

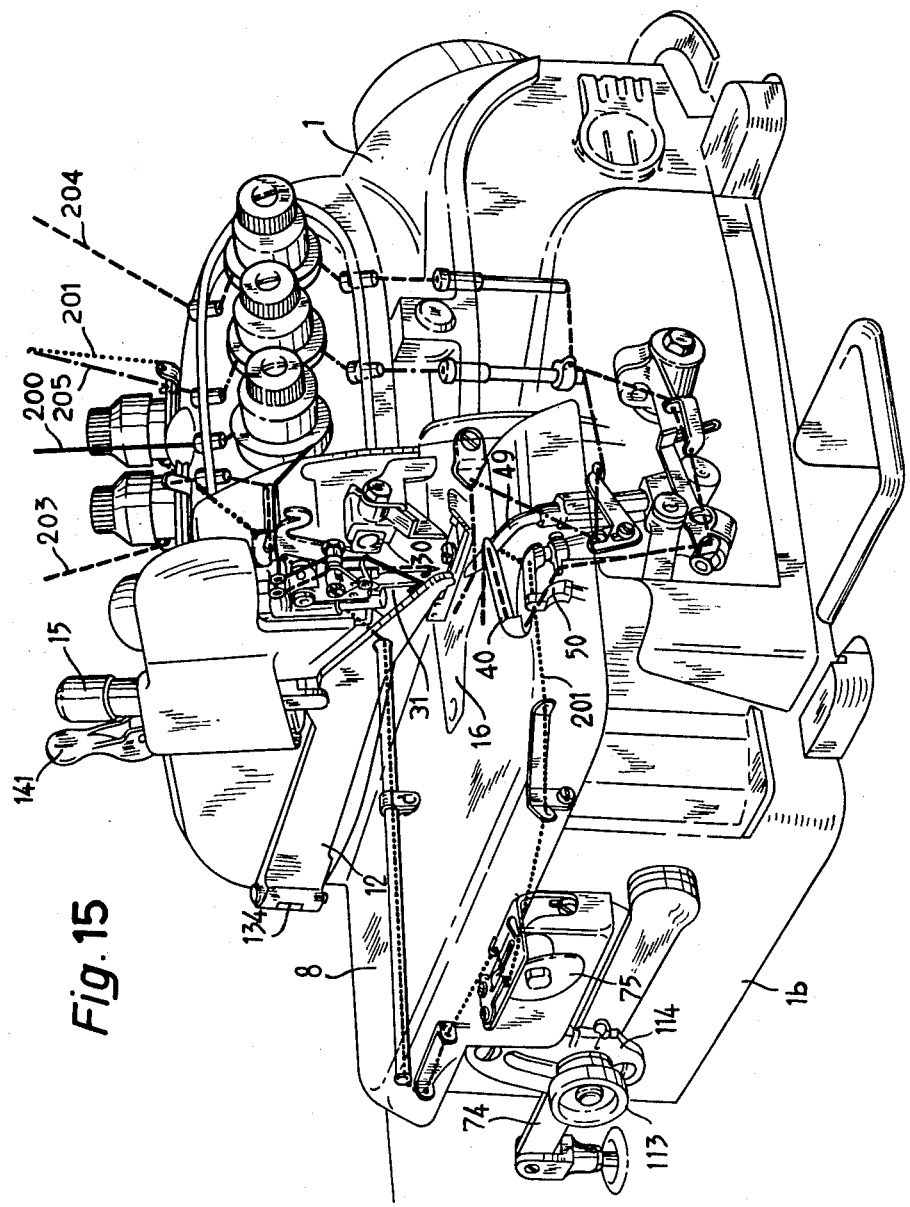

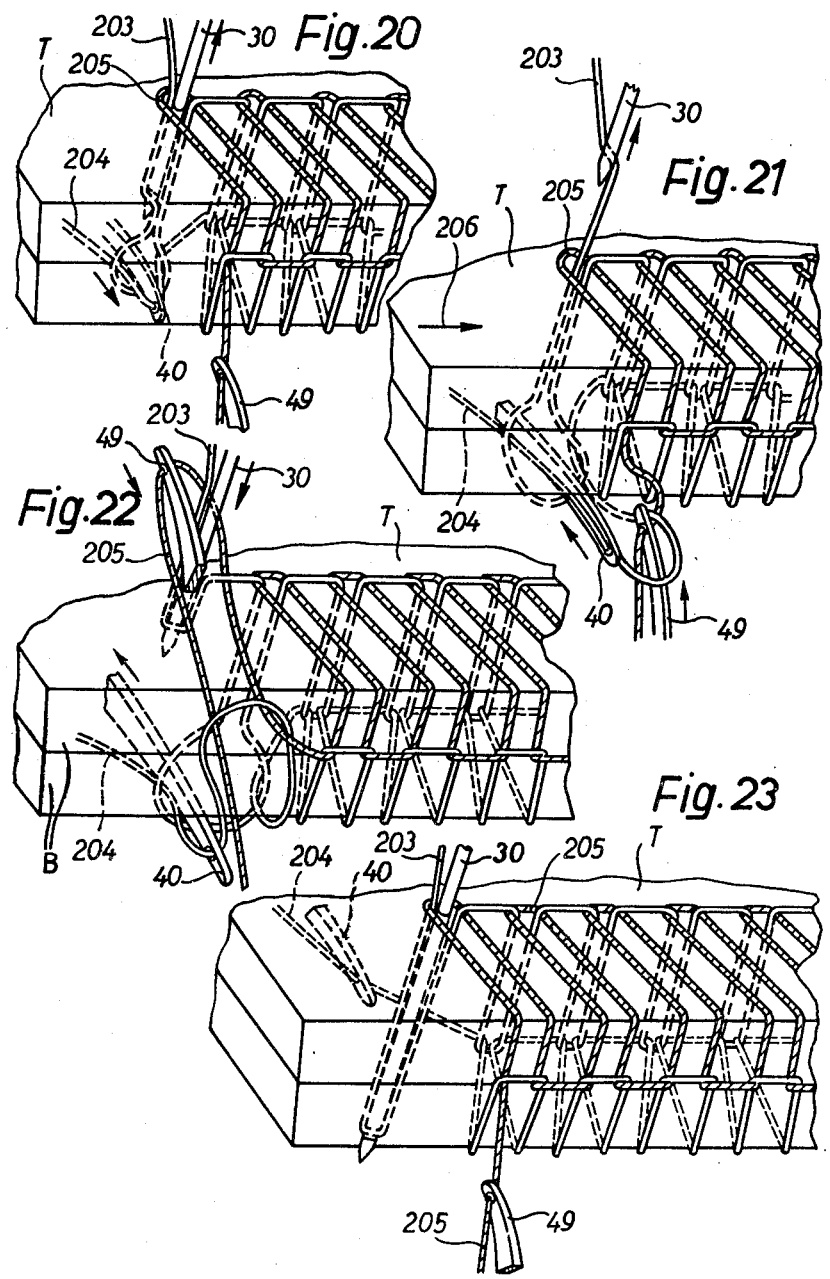

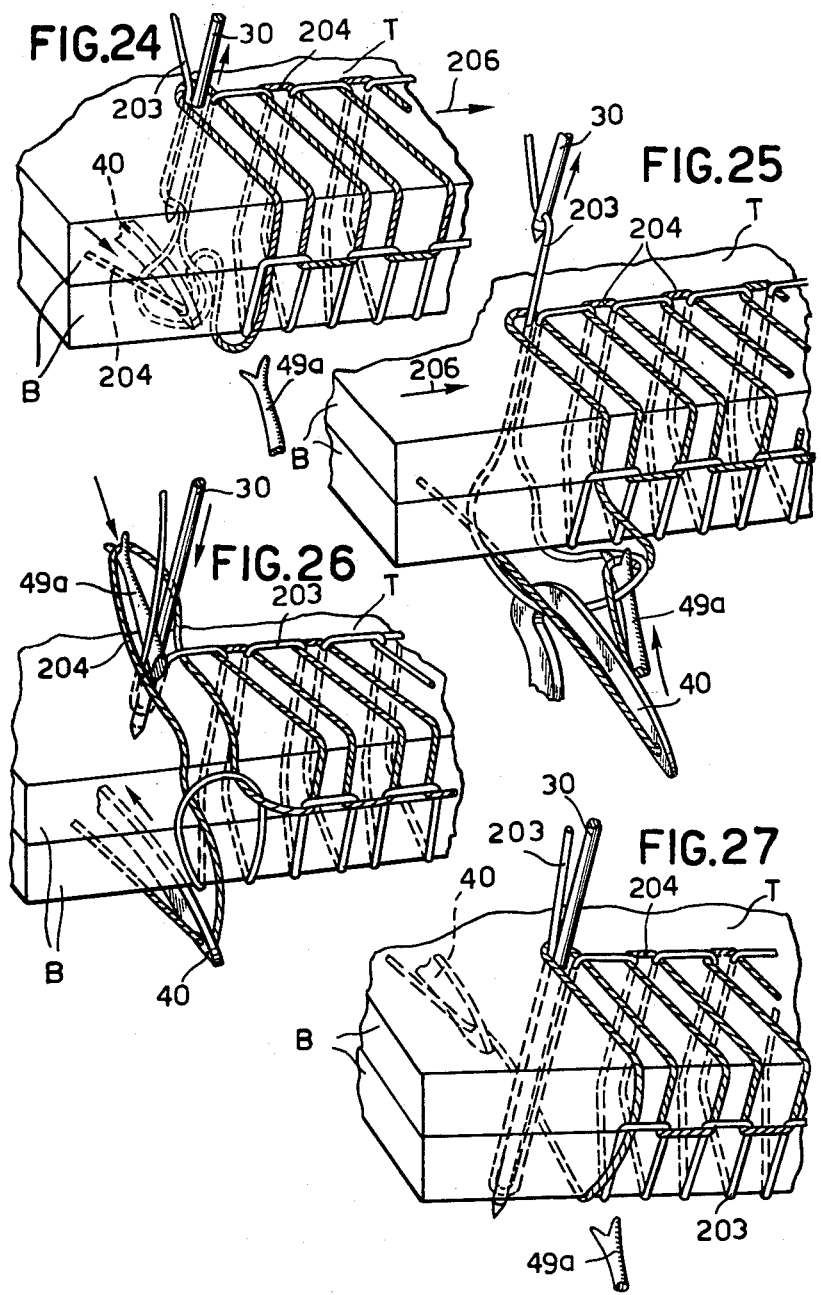

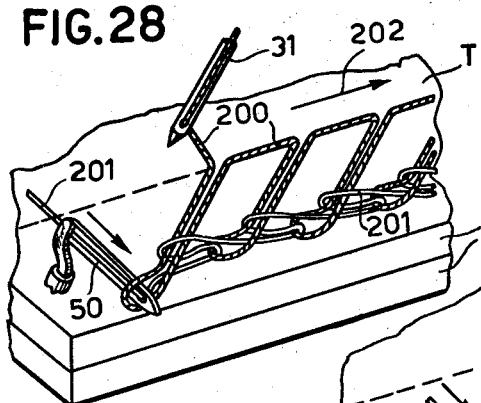
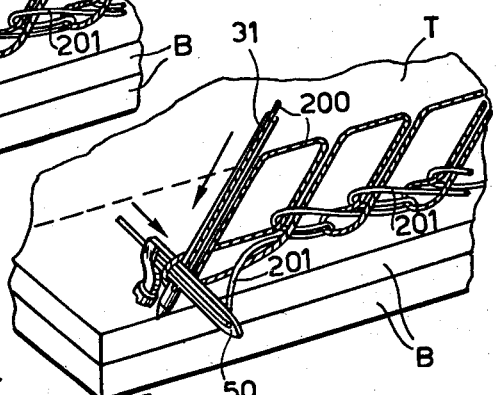
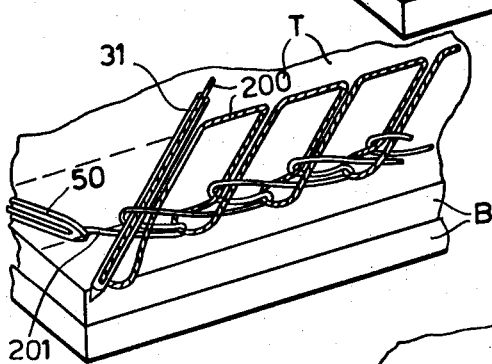
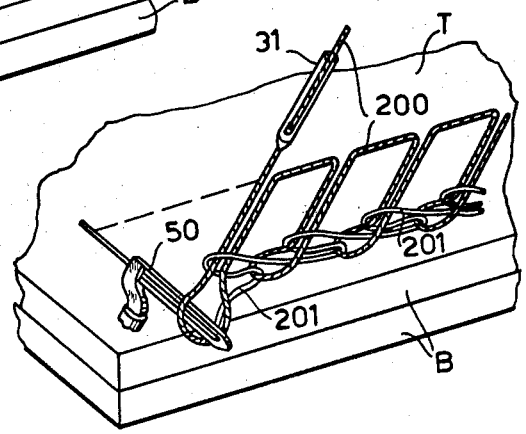

United States Patent Office 3,145,672
Patented Aug. 25, 1964

3,145,672
OVEREDGE STITCHING MACHINE
Nerino Marforio, Milan, Italy, assignor to S.p.A.
Virginio Rimoldi & C., Milan, Italy
Filed Mar. 20, 1962, Ser. No. 180,996
Claims priority, application Italy Apr. 6, 1961
2 Claims. (Cl. 112—162)

This invention relates generally to sewing machines and more particularly to an overedge stitching machine for industrial use adapted to perform simultaneously a two or three-thread overedge stitch and a double chain stitch row of stitches or so-called safety seam.

The overedge stitching machine according to the invention is adapted to trim the margins of workpieces and interconnect them by a two or three-thread overedge seam and at the same time stitch a double chain two-thread seam extending parallel with the overedge seam further interconnecting the workpieces along a line offset from their margins. In order to accomplish this the machine is provided with a needle bar carrying two needles, loopers cooperating with the needles to form the overedge stitch and a two-thread chain stitch and means for feeding the workpieces being sewn. The machine is equipped with a single longitudinal main driving shaft rotatably mounted on the machine frame and extending beneath the plate which forms a working table or table over which the work is advanced.

A machine of this kind performs the work which is normally performed in succession by two distinct machines. The machine performs the work performed by a conventional overedge stitching machine which effects the overedge stitch and simultaneously trims the edges of the work being sewn and a chain-stitch sewing machine which effects the two-thread chain stitch, or a rotary machine adapted to effect a double stitch.

A principal object of this invention is to provide a machine of the type referred to adapted to simultaneously effect an overedge stitch and two-thread chain stitch and which compares favorably in efficiency with a conventional overedge stitching machine and effects a two-thread chain stitch comparable in standard with the stitch formed by a machine adapted to form a two-thread chain stitch exclusively.

Another object of this invention is to provide a machine of the type referred to having a minimum number of additional parts than those found in a conventional overedge stitching machine and practically of the same overall size and fundamental characteristic structure as a conventional machine.

A feature of the improved machine is that the movement of the looper cooperating to form the two-thread chain stitch in a plane parallel with the axis of the main driving shaft of the machine is derived from the movement of a lower looper cooperating to form the overedge stitch. The simultaneous movement of the looper operative to form the two-thread chain stitch transversely of the axis of the main driving shaft is derived from an eccentric keyed to the shaft in proximity to the end of the shaft which is situated beneath the plate which acts as the working table of the machine.

Other features and advantages of this invention will be clearly understood from the appended description referring by way of a non-limiting example to an embodiment shown on the accompanying drawing, in which:

FIG. 10 is a sectional view taken on line X—X of FIG. 2;

FIGS. 10a and 10b are sectional views similar to the view of FIG. 10, illustrating the parts in two different operative positions;

FIG. 10c is a sectional view taken on lines Xc—Xc of FIG. 2;

FIG. 11 is an end view taken in the direction of the arrow A in FIG. 1;

FIG. 15 is a perspective overall view of the machine and illustrates the paths of the threads therein;

FIGS. 20, 21, 22 and 23 are perspective views diagrammatically illustrating in an enlarged scale four successive stages in the formation of a three-thread overedge stitch according to the invention;

FIGS. 24, 25, 26 and 27 are perspective views diagrammatically illustrating in an enlarged scale four successive stages in the formation of a two-thread overedge stitch according to the invention; and FIGS. 28, 29, 30 and 31 are perspective views diagrammatically illustrating in an enlarged scale the formation of a two-thread chain stitch.

Figure 1:
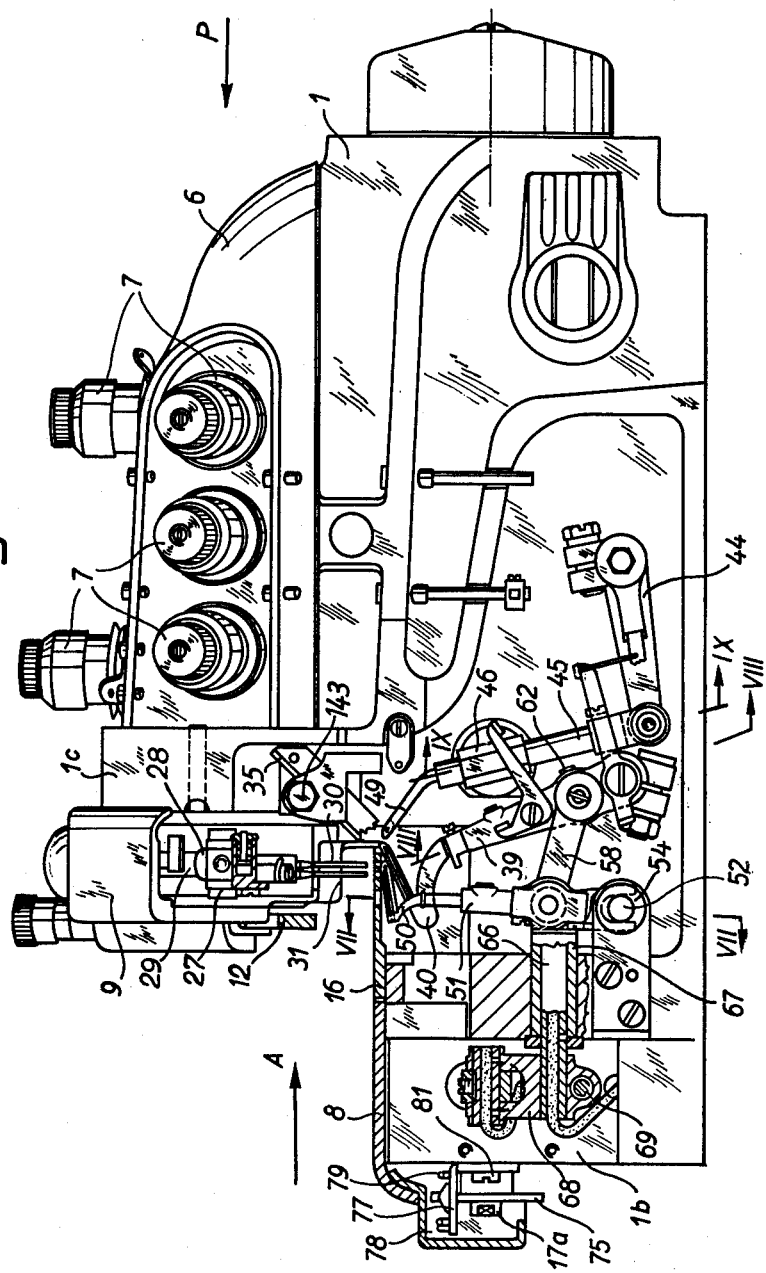
FIG. 1 is a front elevation view, partly in section, of a machine according to the invention.

The machine, according to the invention, as shown in the drawing comprises a frame 1 having seals 2 and resting on a carter 3 forming a reservoir for collecting lubricating oil. The carter comprises a lubricating oil circulating pump with its respective oil cleaner and shaft only fragmentarily shown on the drawing and a pulley 4 keyed to the shaft for driving the pump.

Figure 3:
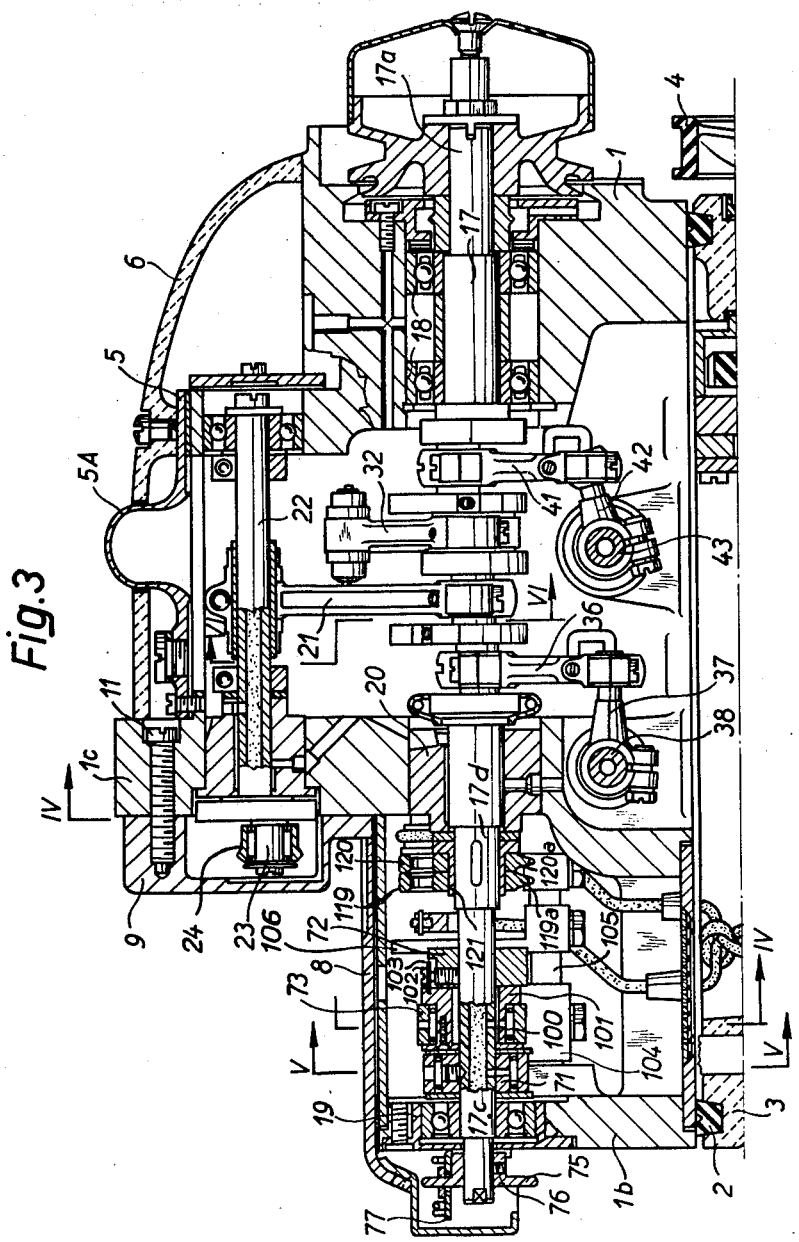
FIG. 3 is a longitudinal sectional view taken on line III—III of FIG. 2.

The middle portion of the frame is open above an oil case and the machine is closed at the top by a cover 5 made of a transparent material. The cover is protected by an outer cover 6 except for a small domeshaped projection 5a extending upwardly on which are mounted a plurality of adjustable thread stretchers 7. A lower portion 1a of the frame ends at its forward end as a side wall 1b. The lower frame portion is covered by a plate 8 forming a working table over which the work being sewn is advanced. A cover 9, FIGS. 1, 3 and 11, is secured by means of screws 10, 11 to a forward wall 1c of the frame. This cover is adapted to shield the mechanisms supported on the wall 1c and described hereafter. The cover 9 carries externally thereof a lever 12 supporting a pressure foot 13 cooperating in feeding or advancing the work.

The lever 12 is secured intermediate its end to a rod 14 carrying a fork biased by a spring 15 which urges the lever 12 together with the pressure foot 13 downwardly in the direction of a needle plate 16, FIG. 1, which is flush with the working table 8. The lever 12 ends in a fork 132 at its end remote from the pressure foot 13. The forked end is hinged by a pivot pin 133 to a bored plug 134 fast with the front face of a pivot 135 parallel with the working surface of the machine and rotatably mounted on the wall 1c of the machine frame. The pivot 135 extends beyond the opposite side of the wall 1c and has secured to its protruding portion a lever 136. The end of the pivot 135, to which the plug 134 is fixed, also has fixed thereto an arm 137. This arm extends longitudinally within a recess 12a in the face of the lever 12 disposed towards the wall 1c.

The rod 14 is provided adjacent its lower end with a roller 14a which has its axis of rotation normal to the axis of the rod and engages a shoulder 12b on the lever 12. Above the roller 14a the rod 14 is formed with a tooth 14b which is normally engaged from the bottom by a collar 138 on a pivot or pin 139 extending parallel with the rod 14 and urged downwardly by a spring 140. The top end of the pivot 139 is articulated between the arms of the fork 121 terminating in a small lever 141. The fork is so arranged that by depressing the lever 141 to rotate it in the direction of the arrow 142 the pivot 139 is lifted and the collar 138 engaged with each tooth 14b so that the rod 14 is lifted against the action of the spring 15. On lifting of the pivot 14 the roller 14a no longer engages the shoulder 12a on the lever 12 so that this lever can swing laterally on the pivot 133 as well as rotate about the axis of the pivot 135 as soon as the arm 137 in recess 12a in the lever 12 is disengaged. In order to raise the pressure foot 13 from the needle plate 16 the lever 136 is lowered. This rotates the pivot 135 counter-clockwise, whereby the arm 137 raises the lever 12 against the action of a spring 15, simultaneously avoiding stress on the pivot 133.

A main drive shaft 17 for the machine, FIG. 3, is rotatably supported in a rear frame portion by bearings 18 and in the forward frame wall 1b by a bearing 19. The shaft 17 is supported intermediate its ends by a bushing 20 secured in the frame 1 and carries on a rear end portion 17a a pulley for a transmission belt which rotates the shaft and travels over the pump driving pulley 4. The shaft 17 is provided intermediate the bearings 18 and bushing 20 with a crank transmitting motion through a connecting rod 21 to an arm 22a, FIG. 6, fixed on a top shaft 22.

The top shaft 22 carries at a forward end thereof a crank pin 23 having fulcrumed thereto the middle portion of an arm 24. The rear end of the arm 24 is, FIG. 4, pivotally articulated at 25 to a link 26 pivoted at 26a to the frame. The forward end of the arm 24 is fork-shaped and is articulated at 27 to a slide 28 slidable axially of a guide bar 29, carrying two needles 30, 31, FIG. 1, acting to form the overedge and the two-thread chain stitch, respectively. The length of the rod 21 and arm 22a are such that during rotation of the main shaft 17 the shaft 22 oscillates in arc of about 60°. The position of the pivot 23 on the shaft 22 is such that the crank pin 23 oscillates through an arc of about 30° on both sides of a plane perpendicular to the guide bar 29 and containing the axes of the pivots 25 and 27 and the axis of the shaft 22.

The arrangement is preferably such that the spacing of the path of the axis of the pivot 27 and a line parallel with the path and extending through the axis of a pivot 26a is twice the spacing of the axis of the shaft 22 and the path and line mentioned above. The spacing of the axes of the shaft 22 and the axis of the crank pin 23 preferably amounts to one sixth of the first-mentioned spacing of the path of the axis of the pivot 27 and line extending through the axis of the pivot 26a. With this arrangement the paths of the slide 28, hence of the needles 30 and 31, are substantially rectilinear and in a stroke of about 25 mm. they are not displaced by more than 1.5 to 2 microns from an accurate rectilinear path, at the region where this path intercepts the plane containing the axes of the pivots 25 and 27 and the axis of the shaft 22, that is, at the region at which displacement is greatest. The differences between the actual paths and the theoretical ones of the above-mentioned components do not affect correct operation of the mechanism controlling movement of the needles, or correct stitch formation.

Figure 4:
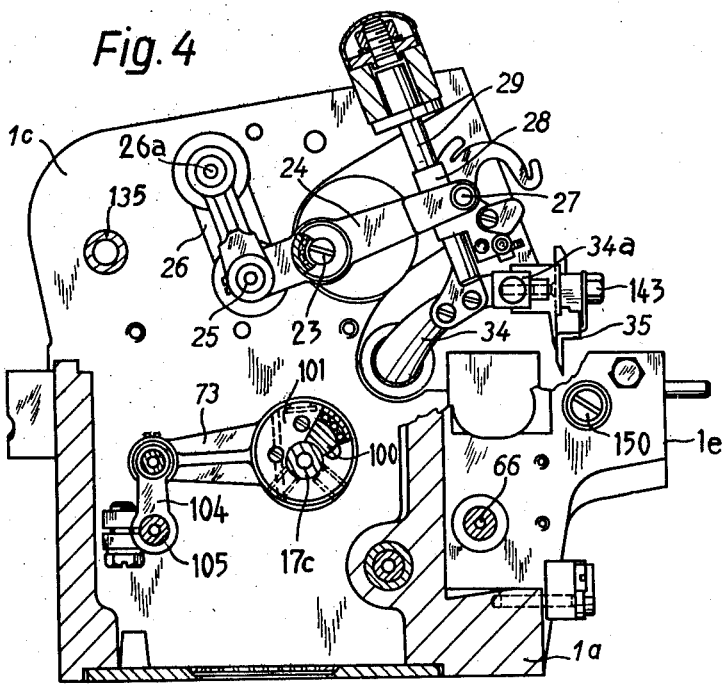
FIGS. 4, 5 and 6 are sectional views taken on lines IV—IV, V—V, VI—VI of FIG. 3 respectively.
Figure 6:
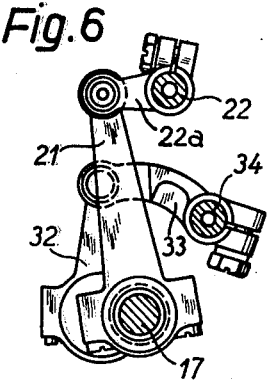
Figure 7:
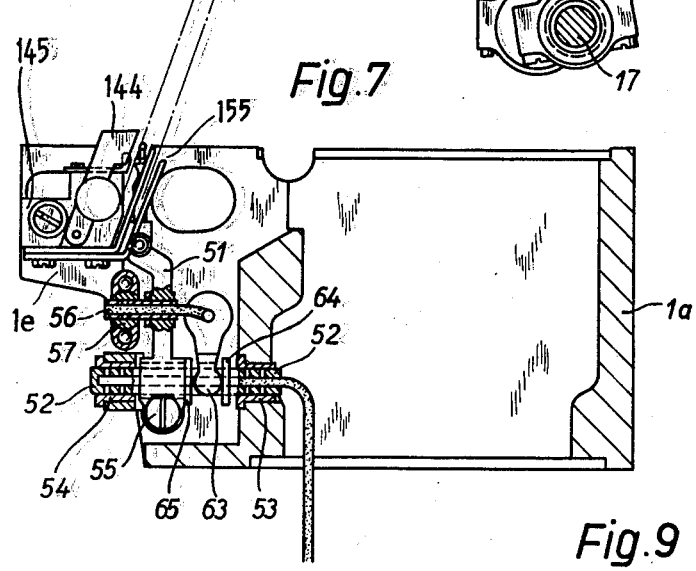
FIGS. 7, 8 and 9 are sectional views taken on lines VII—VII, VIII—VIII and IX—IX respectively of FIG. 1.

Besides the crank driving the connecting rod 21 another crank, FIGS. 3, 4 and 6, is provided on the main shaft 17 which drives a connecting rod 32 transmitting motion to the work cutting device. This other crank is connected to a crank rod 32 articulated to a lever 33 keyed to a small shaft 34 ending as a square-shaped guide 34a having secured thereto a cutting blade 35. The blade 35 is movable and can be displaced longitudinally by slackening a bolt 143. This blade cooperates with a stationary blade 144, FIG. 7, adjustably fixed to a support 145 connected to a portion 1e of the machine frame, FIGS. 2, 7 and 11, which supports the needle plate 16.

Figure 2:
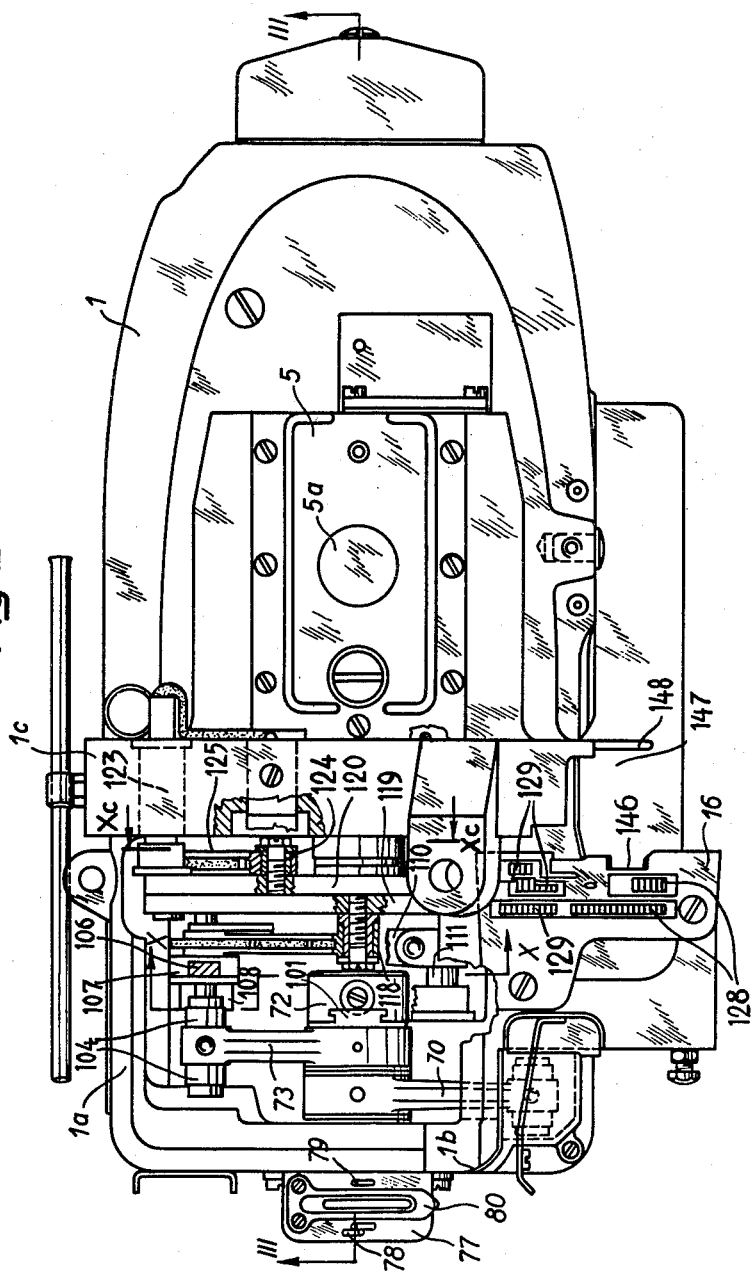
FIG. 2 is a plan view of the machine in FIG. 1, from which the working table and the cap closing the machine at the top have been removed.
Figure 14:
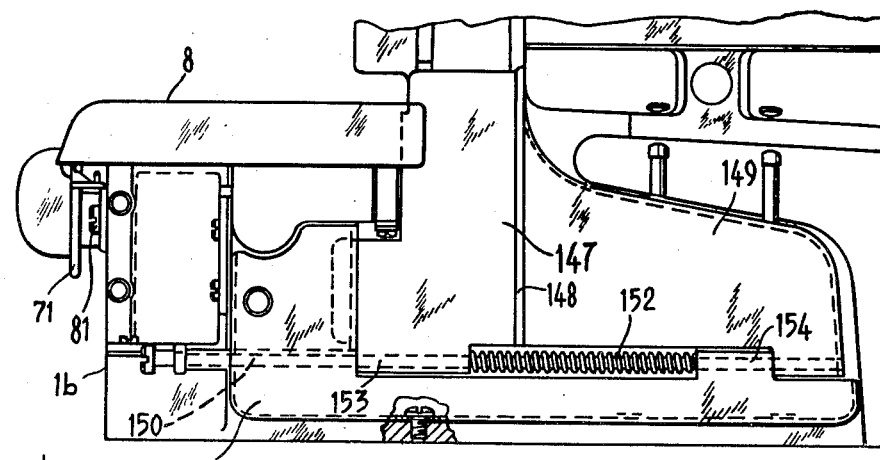
FIG. 14 is an elevational view of a part of the machine.

The stationary blade 144 projects slightly above the top surface of the needle plate and is arranged at the recess 146, FIG. 2, of said plate. The work during sewing is cut between the blades 35 and 144, travels downwardly along a chute 147 defined, a certain distance apart from the needle plate 16, by a projecting rib 148 on the cover 149, FIG. 14, mounted for oscillation about a horizontal axis or rod 150 secured to a base cover 151 closing lateral access to the internal machine parts. A helical spring 152 is wound about the horizontal rod 150 and is interposed between tabs 153, 154 on two covers 149, 151. The cover 149 can be opened by pivoting it about the axis 150 against the resistance of the spring 152, thereby releasing its edge, disposed towards the needle plate, from a guide 155, FIG. 7, fitted to the portion 1e of the frame in proximity to the stationary blade 144.

Figures 8, 9:
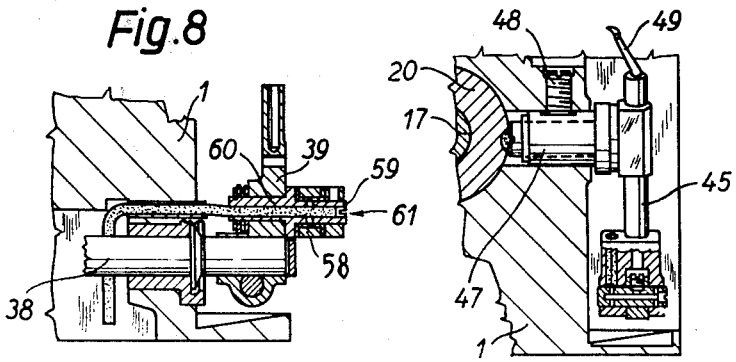

Other cranks are provided on shaft 17 on both sides, FIGS. 1 and 3, of the cranks driving the connecting rod 21 and connecting rod 32. A first of these other cranks 36 drives an arm 37 fast with a cross pin 38 having secured thereto an arm 39 supporting, FIG. 1, a lower looper 40 cooperating with a needle 30 for forming an overedge stitch as hereafter described. Another crank on the main shaft 17 drives a connecting rod 41 articulated to an arm 42 which is secured to a cross pin 43 carrying a lever 44. The lever 44 is hinged at its opposite end to an arm 45 slidably mounted in an opening formed within a T-shaped head of a pin 46. The pin 46 is pivotally mounted, FIG. 9, in a bushing 47 secured in the frame by means of a screw 48. The upwardly extending end of the arm 45 carries, FIGS. 1 and 9, a top looper 49 cooperating with the looper 40 and with the needle 30 to form the overedge stitch later described. The mechanism for transmitting motion to the looper 40 is disclosed in United States Letters Patent, No. 2,811,940 of November 5, 1957. The two loopers 40, 49 both receive thread when the machine forms a three-thread overedge stitch as hereafter described. However, when a two-thread overedge stitch is desired, the thread is supplied to the lower looper 40 only, the top looper 49 being of suitable construction for cooperating in knotting with the thread in the needle 30.

A third looper 50, FIG. 1, is arranged near the bottom looper 40 and is adapted to cooperate with the needle 31 for forming the two-thread chain stitch which is offset from the overedge stitch formed through cooperation of the needle 30 with the other loopers 40, 49. The looper 50 is secured to an arm 51 fast with a shaft 52 capable of rotation and axial displacement in bushings 53, 54, FIGS. 7 and 8, fast with the frame 1. The arm 51 carrying the looper 50 is secured to shaft 52 by a strap clamped by a screw 55. A cross pin 56 is driven mid-height of the arm 51. A perforated spherical roller 57 is fitted on the cross pin 56 and enclosed by the end of the connecting rod 58, the small end of which is fitted on an eccentric pin 59 at the rearward end 60 of the pin. The rearward end 60 of the pin 59 extends through the arm 39 carrying the lower looper 40, and is adjustable in position by means of a screw driver engageable in a notch 61 formed at the end of the pin 59. The pin end 60 is retained by tightening, FIG. 1, the screw 62. This structure is provided for varying the angular position of the arm 51 in order to cause the looper to operate synchronously with the needle 31.

Figure 5:
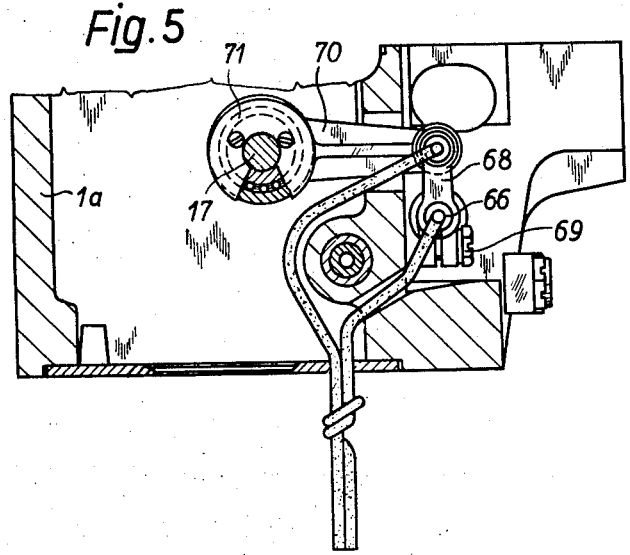

As mentioned above the shaft 52 to which the arm 51 is attached is capable of axial displacement. This displacement is effected through a fork 63, FIG. 7, engaged between a collar 64 fast with the shaft 52 and a washer 65 on the bushing reaching within the strap for the arm 51 clamped to the shaft 52. The fork 63 is provided, FIG. 1, at the end of a shaft 66 rotatably mounted, in a bushing 67 carried by a lateral projection on the frame, extending parallel with the main driving shaft 17. The shaft 66 carries a fork 68 clamped on the shaft 66 by means of a strap, FIG. 5, tightened by a screw 69, articulated at its other end to a connecting rod 70 receiving motion from an eccentric 71 keyed to the main driving shaft 17. The eccentric 71 is arranged in proximity to the bearing 19 supporting, FIGS. 1, 2, 3 the forward end of the main driving shaft 17. An eccentric 72 is arranged near the eccentric 71 and transmits motion through a connecting rod 73 to the mechanisms effecting movement of feed dogs operative to feed the work as hereafter described.

The connecting rod 73 is rotatably mounted on a sleeve 100, FIGS. 1, 3 and 4 eccentric with respect to the axis of the shaft 17. The sleeve 100 is formed with an inner through bore, which exceeds in diameter a portion 17c of the main driving shaft 17 on which the sleeve 100 is fitted. The sleeve 100 is moreover formed with a forward extension 101 provided with lateral flanges parallel with one another extending diametrically with respect to the sleeve, so that the extension takes a T-shape in cross-section, FIG. 2. This extension 101 is slidably mounted in a diametrical guide formed in the face of the disc 72 disposed towards the sleeve 100. The extension 101 can be fixed in a desired position in the guide by adjusting screw 102 which engages through a washer 103 the extension 101 on the sleeve 100, FIG. 3. It is thereby possible to vary at will the eccentricity of the sleeve 100 with respect to the axis of the shaft 17, hence the stroke of the connecting rod 73. The small end of the rod is articulated to a fork 104 secured to a shaft 105, FIGS. 2, 3 and 5, mounted for oscillation on the portions 1b and 1c of the frame 1. The shaft 105, which extends parallel with the shaft 17 has secured thereto an arcuate arm 106, FIGS. 10, 10a, 10b and 10c.

The arcuate arm 106 has slidably mounted thereon a slide 107 having, on its side remote from the arm 106, a pivot on which the end of a small connecting rod 108 is pivotally mounted. The pivot extends beyond the connecting rod 108 and has articulated to its end and the top end portion of an arcuate arm 109, the lower end portion of which is articulated to the free end of a substantially horizontal arm 110. The approximately horizontal arm 110 extends transversely of the shaft 17, and beneath it. It is secured to a shaft 111, which is likewise parallel with the shaft 17 and is rotatably mounted on the machine frame portions 1b and 1c. The shaft 111 extends outwardly through the wall 1b and carries a lever 74, FIGS. 11 and 15, which can be oscillated about the axis of the shaft 111, as indicated by the arrow 112. The lever 72 is formed with a bore having screwed therein a threaded shank on a knob 113 which is separated from the lever by a plate 114 supported by the wall 1b of the frame, spaced from the latter by a clearance sufficient for the lever 74 to pass freely therethrough.

The plate 114 is formed with an arcuate slot 115, through which the threaded shank on the knob 113 extends, having its center of curvature situated on the axis of the shaft 111. It will be obvious that by tightening the knob 113 against the plate 114, the lever 74 can be given a stable position, which also applies to the shaft 111, levers 110 and 119, slide 107 on the arm 106 thereby terminating the length of the stroke performed by the small connecting rod end 108 by the oscillation of the arcuate arm 106 secured to the shaft 105. The arm 106 oscillates under the control of the small connecting rod 73 on the fork 104 keyed to the shaft 105.

To effect control of the extent of the stroke of the connecting rod 108, the plate is provided with a graduated scale 116, FIG. 11, cooperating with a pointer 117 carried by the lever 74. The end of the connecting rod 108 remote from the end articulated to the slide 107, is mounted for oscillation on a pivot 118 fast with a bar 119 carrying the feed dog 128, FIGS. 2, 10 and 10a–10c. The feed dog extends transversely of the main shaft 17 and adjacent a second bar 120 carrying feed dog 129 almost identical with the other. The bars 119, 120 are each formed with an annular projection 119a, 120a, respectively, which define guides inserted on the sleeve 121 keyed to the section 17d of the main shaft 17, slightly eccentric with respect to the axis of the shaft.

With this construction upon rotation of the main driving shaft the bars 119, 120 perform a periodic simultaneous lifting and lowering movement. The ends of the guides 119, 120 arranged approximately above the shaft 105, FIGS. 2, 10 and 10a, d, c are in the form of forks embracing a block 122 mounted for oscillation on an eccentric pivot, not shown, fast with the pivot 123 rotatably mounted in the portion 1c of the frame. The pivot 123 is normally held in a preselected position by the screw 123a, FIG. 12. It is thus possible to vary the position of the block 122 as well as the inclination of the bars 119, 120 with respect to the working plane 8. The bar 120 is connected by a pivot 124, FIG. 2, secured to the bar, to a connecting rod 125 articulated to the end of an arm 126, FIG. 10c, secured in turn to the end of the shaft 105 extending beyond the bar 120 in the direction of the wall. The arm 126 is arcuate, FIG. 10, and is formed with a slot 127 in which a pivot pin 126a is slidably fixed, capable of being held in a preselected position at the machine adjusting stage. The pivot pin 126a is fixed on a small connecting rod 125, consequently the stroke of the connecting rod 125 equals the stroke of the bar 120 and is normally constant during operation of the machine.

The bars 119, 120 each carry feed dogs 128, 129 respectively, at their end underlying the needle plate, FIG. 2, secured to said bars at the guides 119b, 120b, FIGS. 10 and 10c by means of bolts. The feed dogs 128, 129 are situated in openings in the needle plate 16 in which passages 130 and 131 for the needles 31, 30 respectively, are formed. The needles cooperating in forming the double-chain stitch and overlock stitch, respectively.

Figure 12:
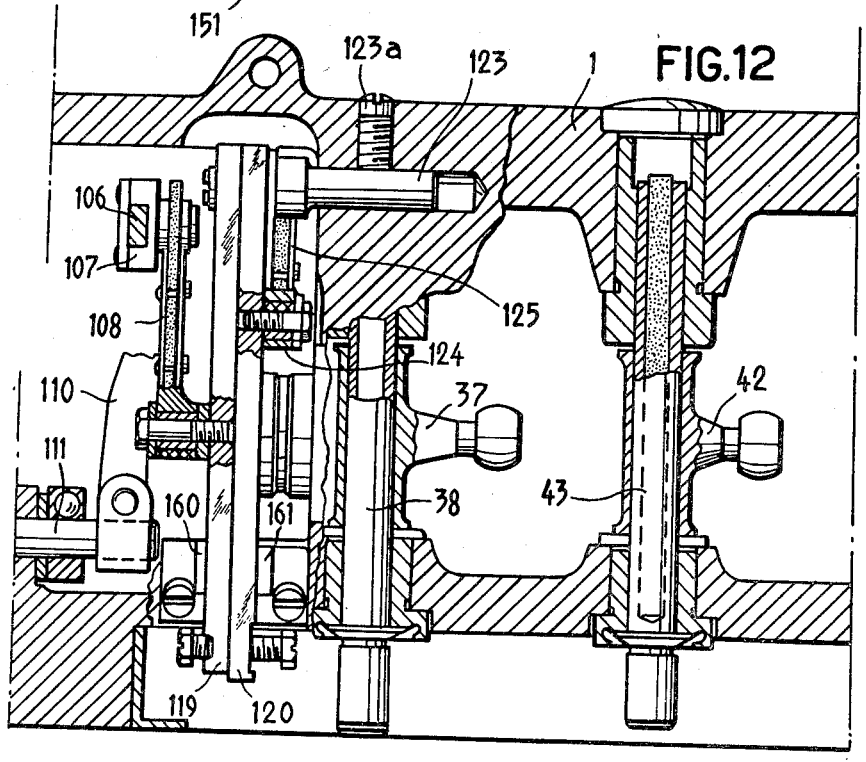
FIG. 12 is a fragmentary sectional view taken on line XII—XII of FIG. 3.
Figure 13:
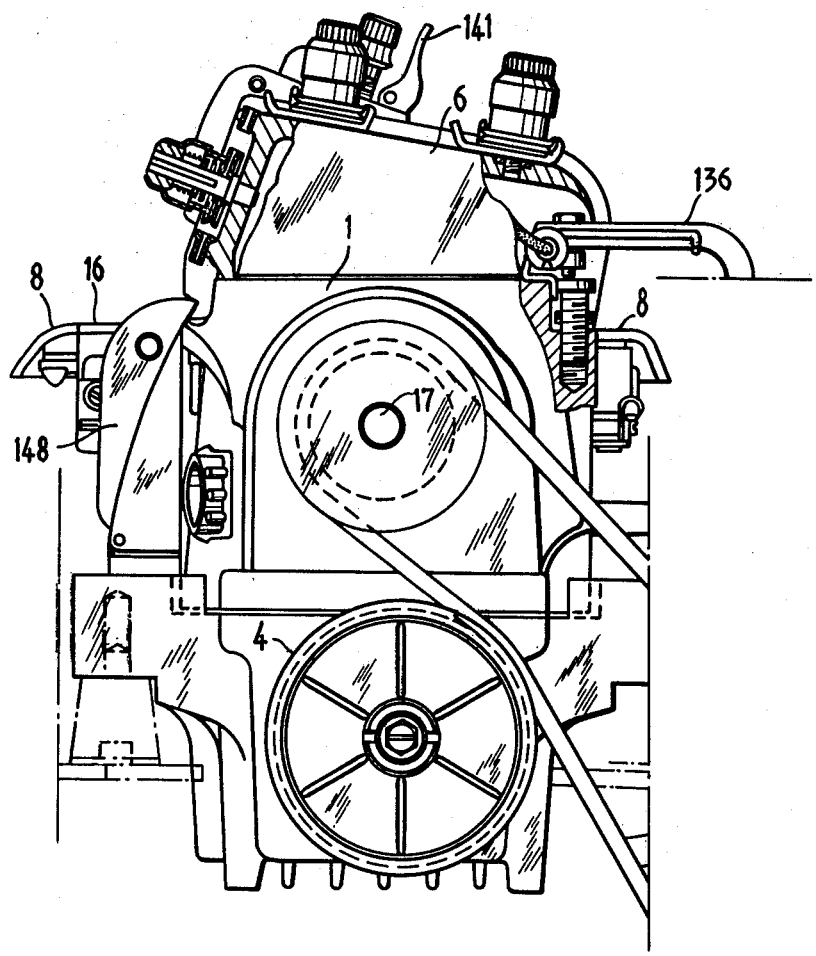
FIG. 13 is an end view taken in the direction of the arrow P in FIG. 1.
Figure 17:
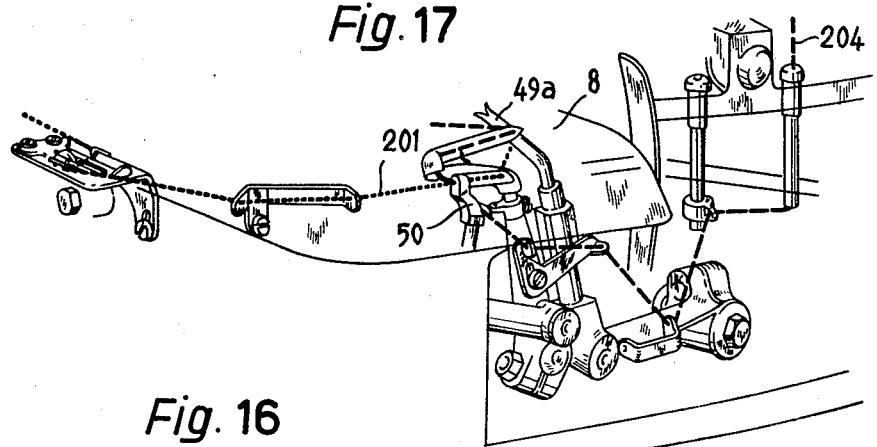
FIG. 17 is a perspective view, on an enlarged scale, of some details of a modification of the machine according to the invention.

Movement in a lateral direction of the bars 119, 120 in proximity to their ends supporting the feed dogs 128, 129 is prevented by the provision of bell-cranks 160, 161 secured to the frame, FIG. 12, which forms together a guide for the bars 119, 120. It will be clear from the above that it is possible to obtain by the mechanism as described the following effects:

a. Adjustment in length of the stroke of the connecting rod 73, hence simultaneous adjustment of the strokes of the feed dogs 128, 129. This is obtained because variation in stroke of the connecting rod 73 results in variation in width of oscillation of the shaft 105;

b. Initial adjustment in length of the stroke of the feed dog 129;

c. Positioning of the bars 119, 120 by acting on pivot 123, and finally, d. Variation, which can be effected even during operation of the machine by displacing the lever 74, FIG. 11, of the length of the stroke of the feed dog 128.

FIGS. 10a, 10b show in full lines and broken lines, respectively, the extreme positions taken by the feed dogs 128 and their respective control members in both cases in which the lever 74 is arranged at its lowermost position to which there corresponds a minimum stroke of the feed dogs 128, and at its topmost position, respectively, to which there corresponds the maximum stroke of the feed dogs 128.

The main driving shaft 17 extends, FIG. 3, a short length beyond the bearing 19. A cam 75 is mounted on the protruding portion of the shaft 17 and is secured to it by means of screws 76, so that it can be angularly displaced with respect to the shaft. The cam 75 extends through a slot formed in a bracket 77 carrying, FIG. 2, on its top face pins 78, 79 for guiding the thread which is supplied to the looper 50. The bracket 77 has secured thereto a frame-shaped spring 80 adapted to press the thread traveling over the pins 78, 79 against the surface of the bracket 77 and against the cam periphery projecting through the slot formed in the bracket 77. The cam is so shaped as to stretch or slacken the thread, respectively, according to the position taken by the looper 50 to the needle 31 during formation of the two-thread chain stitch.

It will be seen from FIG. 11 that the bracket 77 is mounted for adjustment in height. The adjustment is effected by loosening the screw 81 engaged by eyelets 82 fast with the bracket. With this adjustment a length of the thread portion between the pins 78, 79, hence the tension of the thread can be varied.

The formation of the row of stitches can easily be understood by reference to FIGS. 15 to 31. FIG. 15 illustrates the paths of the various threads which are fed to the machine in order to simultaneously stitch the two rows of stitches. A thread 200 fed to the needle 31 and a thread 201 fed to the looper 50 form the two-thread chain stitch displaced (to the left in FIG. 15) with respect to the edge of the work being sewn. Other threads 203, 204 and 205 are fed to the needle 30, looper 40 and looper 49, respectively and form the three-thread overlock stitch. In FIG. 15 the parts covering the guide members for guiding the various threads are illustrated as if they were transparent.

Figure 16:
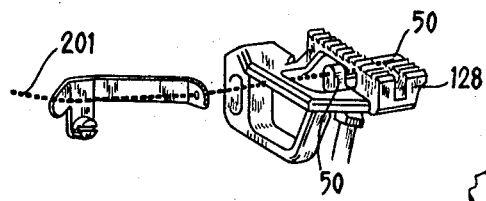
FIG. 16 is a perspective view, on an enlarged scale, of a detail of the machine of FIG. 15.
Figure 19:
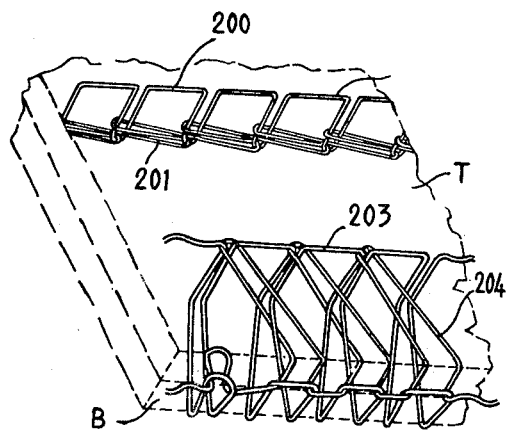
FIG. 19 is a fragmentary perspective view of work diagrammatically illustrating a two-thread chain stitch and a two-thread overedge stitch formed on the work.
Figure 18:
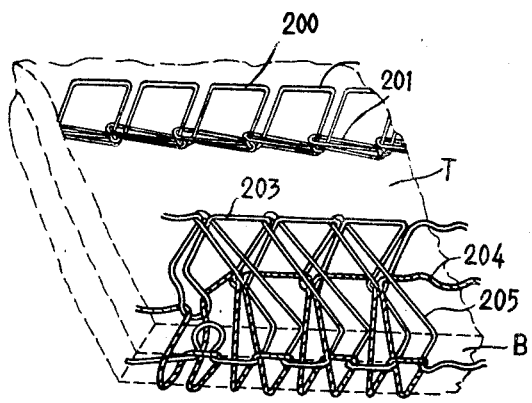
FIG. 18 is a fragmentary diagrammatic perspective view of work diagrammatically illustrating a two-thread chain stitch and a three-thread overlock stitch produced on the work by the machine according to the invention.

FIG. 16 illustrates the arrangement of the feed dog 128 and looper 50. When it is desired to form at the same time as a two-thread chain stitch a two-thread overlock stitch, the thread 205 is omitted, and the looper 49 provided near its tip with a hole for the thread is substituted by a looper 49a shown in FIG. 17, having a fork-shaped end. The formation of the various stitches, shown in FIGS. 18 and 19, will now be described with reference to FIGS. 20 to 31. More particularly FIGS. 20 to 23 illustrate four stages of the formation of the three-thread overlock stitch.

It should be recalled that the looper 40 performs oscillating movement only beneath the work which travels on the working surface 8 of the machine, and the looper 49 performs an oscillating movement from beneath to cover the work. In FIG. 20 the needle 30 is illustrated as being withdrawn from the work T, and the tip of the looper 49 has been inserted into the loop of the needle thread. The looper 49 is disposed beneath the level at which the work rests. In FIG. 21 the needle 30 has been fully withdrawn from the work and the looper 40 extends further into a loop in the needle thread 203 and has approached the looper 49 which has risen and its tip as illustrated as being inserted into a loop in the thread 204 of the looper 40. The work is displaced by the feed dogs 128, 129 in the direction of the arrow 206. When the looper 49 has reached, FIG. 22, a position above the work and has carried along the loop in the thread 204 onto the edge B of the work to be sewn the needle 30 is moved downwardly and fits into the loop in the thread 205 of the looper 49.

In FIG. 23 the needle 30 is shown in its fully lowered position, the loop in the thread 204 has slipped on the loop in the thread 205. The looper 49 has been returned to a position beneath the level of the work to tighten its loop around the thread 203 and needle 30 as illustrated. The looper 40 having been oscillated backwardly in order to draw the thread 204 tightly against the loop in the thread 205 and in preparation to be advanced to repeat the cycle as the needle 30 is again withdrawn upwardly from the work and the above-described cycle is again repeated. The three-thread overlock stitch thus formed is very tough, ornamental and resilient and more particularly suited for joining the edges of knitted fabrics.

The formation of the two-thread overlock stitch, by the stitching machine according to the invention, is illustrated in FIGS. 24 to 27. The sequence of operations differs from the one described above only in that the looper 40 on advancing moves the loop in the thread 203 of the needle to a superposed relationship to the work edge B and the looper 49 is replaced by a threadless looper 49a. The looper 49a has a fork-shaped end which forms a loop in the thread 204 of the looper 40 and inserts it into the loop in the needle thread 203, then moves it above the work to cause the needle to be inserted therein as it descends towards the work. The movements of the various members are otherwise identical as described above in connection with the formation of the three-thread overlock stitch.

The formation of the double-chain stitch is illustrated diagrammatically in FIGS. 28 to 31. Since the row of stitches is displaced inwardly from the edge B of the work T which is being sewn, it has been assumed for the sake of clearness that the fabric is transparent, the needle 31, looper 50 and their respective threads 200, 201 being shown in full lines. It will be recalled that the looper 50 acts beneath the plane of the work 8, FIG. 1. FIG. 28 illustrates the needle 31 outside the work at the moment it has completed its upward movement. The feed dogs 129, FIG. 2, transport the work, at each actuation of the feed dogs, in the direction of the arrow 202 by an extent equalling the stitch length. As the needle moves upwardly the looper 50 retains the loop of the needle thread 200 and is situated in a plane behind the needle path of travel.

The looper 50 is advanced to a position in a plane, FIG. 29, situated in front of the path of travel of the needle 31. The needle 31 moves downwardly and extends through the work and is inserted into the loop in the thread 201 of the looper 50 on moving past the looper which then starts its backward movement.

FIG. 30 illustrates the needle 31 performing its upward movement during which it forms a loop in the thread 200. The crochet or looper performs a lateral displacement to come into a plane situated behind the needle path of travel. FIG. 31 illustrates the looper 50 being advanced and inserted into the loop in the needle thread 200. The needle has been withdrawn from the fabric by its upward movement and the looper is about to start its reverse stroke on which it retains the loop in the needle thread. The needle 31 and looper 50 thereupon resume their position shown in FIG. 28, and a new cycle is started.

Synchronism and phase adjustment for formation of the two-thread chain stitch and the three or more thread overlock stitch is insured by the fact that the looper 50 is connected with the loopers 39, 40, FIG. 1, which cooperate in forming the overlock stitch and the fact that the needles 30, 31 are carried by the same slide 28, FIG. 4, as well as the fact that the work to be sewn is fed simultaneously during formation of both types of stitches by the feed dogs 128, 129, FIG. 2, and finally by the fact that the lateral oscillation of the looper 40 about the shaft 66, FIG. 1, and oscillation of the looper 40 about the pivot 38, FIG. 3, and the compound oscillation and longitudinal displacement movement of the looper 49 together and with respect to the T-shaped head of the pin 46, are derived from the same main driving shaft 17.

While preferred embodiments of the invention have been shown and described it will be understood that many modifications and changes can be made within the true spirit and scope of the invention.

What I claim and desire to secure by Letters Patent is:
1. A sewing machine of the overedge stitching type comprising, means to sew work together comprising, means to sew a three-thread overedge stitch along an edge of said work, and means to simultaneously sew a two-thread chain stitch on said work spaced from said overedge stitch and parallel therewith comprising, a needle bar reciprocably driven, two needles on said bar, a plurality of loopers cooperatively actuated in timed relationship with each other and the reciprocably travel of said needles for effecting said two stitches simultaneously, means for actuating said needle bar, means for actuating said loopers in timed relationship relative to each other and said needles, said plurality of loopers comprising one looper actuated to cooperate with one of said needles to sew said chain stitch during advancement of said work and other loopers actuated to cooperate jointly with another of said needles to sew said overedge stitch, a given one of said other loopers actuated to cooperate with the remainder of said other loopers to form said overedge stitch, said means for actuating said loopers in timed relationship relative to each other comprising a pivotally mounted arm carrying said one looper, another pivotally mounted arm carrying said given looper of said other loopers, a connecting rod pivotally connected between said arms for actuating one of said arms from the other of said arms and in timed relationship therewith along a predetermined path, means to vary the angular position of the first-mentioned arm to cause said one looper to operate synchronously with said one needle comprising two pins eccentrically mounted relative to the pivotal axis of said another arm, means mounting one of said pins extending parallel with the pivotal axis of said another arm, the other pin being disposed pivotally connecting said connecting rod to said another arm, and means for varying the eccentric position of said pins relative to said pivotal axis of said another arm.

2. A sewing machine of the overedge stitching type comprising, means to sew work together comprising, means to sew a three-thread overedge stitch along an edge of said work, and means to simultaneously sew a two-thread chain stitch on said work spaced from said overedge stitch and a parallel therewith comprising, a needle bar reciprocably driven, two needles on said bar, a plurality of loopers cooperatively actuated in timed relationship with each other and the reciprocably travel of said needles for effecting said two stitches simultaneously, means for actuating said needle bar, means for actuating said loopers in timed relationship relative to each other and said needles, said plurality of loopers comprising one looper actuated to cooperate with one of said needles to sew said chain stitch during advancement of said work and other loopers actuated to cooperate jointly with another of said needles to sew said overedge stitch, a given one of said other loopers actuated to cooperate with the remainder of said other loopers to form said overedge stitch, said means for actuating said loopers in timed relationship relative to each other comprising a pivotally mounted arm carrying said one looper, another pivotally mounted arm carrying said given looper of said other loopers, a connecting rod pivotally connected between said arms for actuating one of said arms from the other of said arms and in timed relationship therewith along a predetermined path, a pivotal shaft pivotally mounting the first-mentioned arm, means mounting said shaft for selective axial displacement, and means operable from said driving shaft comprising fork means for selectively displacing said shaft axially in timed relationship with reciprocation of said one needle and said loopers.

References Cited in the file of this patent
UNITED STATES PATENTS

| | | |
|---|---|---|
| 1,221,253 | Weis | Apr. 3, 1917 |
| 2,191,046 | Tiesler | Feb. 20, 1940 |
| 2,292,724 | Thompson et al. | Aug. 11, 1942 |
| 2,973,730 | Schweda et al. | Mar. 7, 1961 |
| 2,973,732 | Hayes | Mar. 7, 1961 |
| 3,009,430 | Lutz et al. | Nov. 21, 1961 |